Aug. 25, 1953  C. W. WALZ ET AL  2,650,000
PLANTER
Original Filed Jan. 24, 1946
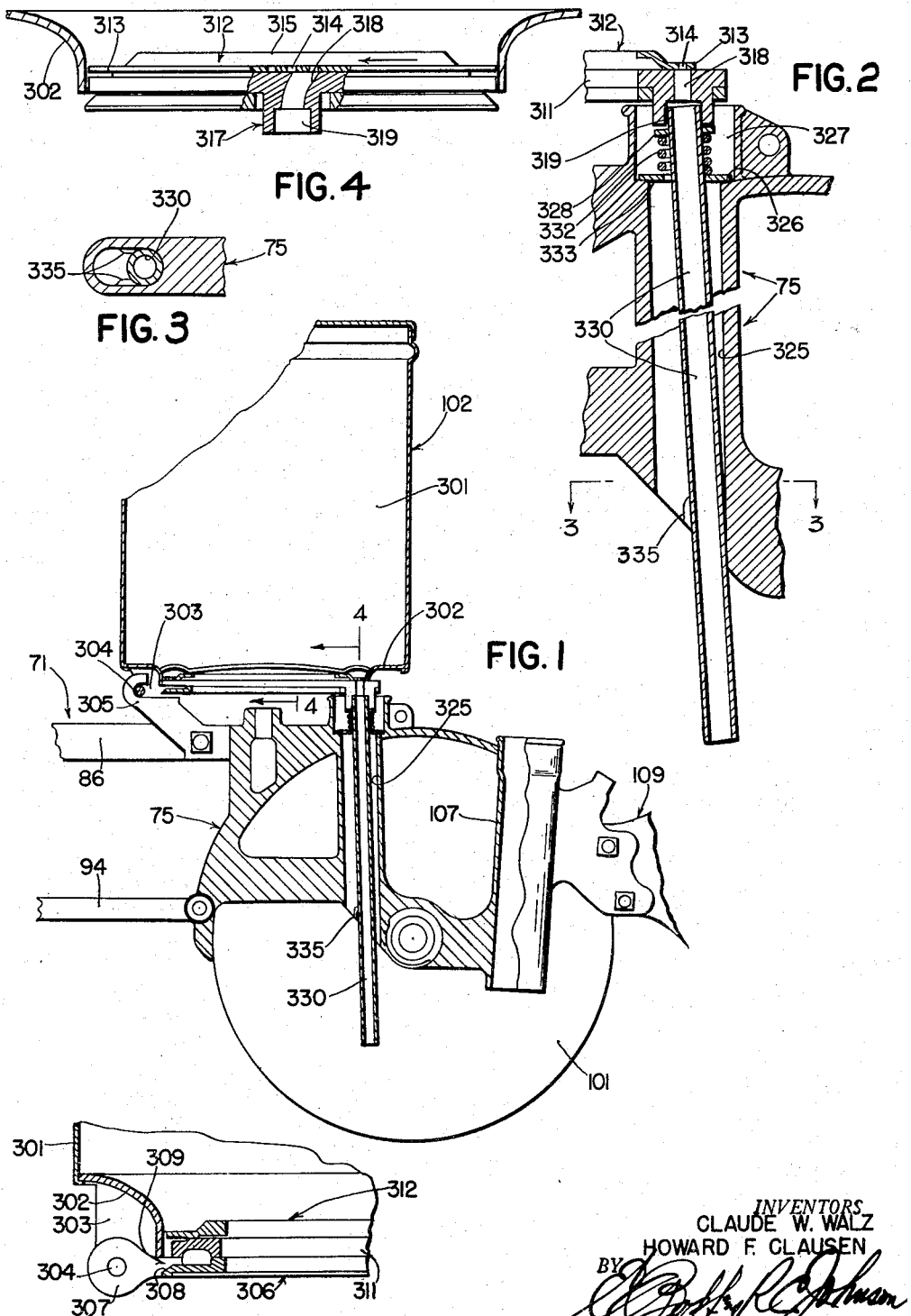
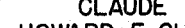
INVENTORS
CLAUDE W. WALZ
HOWARD F. CLAUSEN
BY
ATTORNEYS.

Patented Aug. 25, 1953

2,650,000

UNITED STATES PATENT OFFICE 2,650,000

PLANTER

Claude W. Walz, Rock Island, and Howard F. Clausen, Moline, Ill., assignors to Deere & Company, Moline, Ill., a corporation of Illinois Original application January 24, 1946, Serial No. 643,016. Divided and this application October 6, 1947, Serial No. 778,130

4 Claims. (Cl. 222—185)

This application is a division of our co-pending application, Serial No. 643,016, filed January 24, 1946, Now Patent No. 2,596,060.

The present invention relates generally to agricultural implements and more particularly to planters and the like.

The object and general nature of the present invention is the provision of a towed planter or similar implement especially constructed and arranged for planting in a plurality of relatively closely spaced rows, as is desirable when planting beets, beans, and other crops. A further feature of this invention is the provision of a planter in which the seed cans can be carried in a low position, one on each of the planting units, with the result that the seed passages from the seed dispensing mechanisms into the furrows may be made quite short. This materially improves the accuracy of planting, especially in the case of seeds that are very light, such as sugar beet seed.

Additionally, it is another feature of this invention to provide a tight connection between the seed conduit leading to the furrow opener and the seed can, whereby there is no loss of or interference with the flow of relatively light seed, such as sugar beet seed.

Still further, another feature of this invention is the provision of a new and useful improvement in a seed dispensing apparatus in which dust and trash that is sometimes mixed in with the seed may readily be discharged from the seed can without being caused to collect in the bottom of the latter.

These and other objects and advantages of the present invention will be apparent to those skilled in the art after a consideration of the following detailed description, taken in conjunction with the accompanying drawings in which the preferred form of the present invention has been illustrated.

In the drawings:

Figure 1 is a vertical longitudinal sectional view showing details of the planting unit of a planter in which the principles of the present invention have been incorporated.

Figure 2 is an enlarged sectional view showing the spring mounting for the seed tube.

Figure 3 is a sectional view taken along the line 3—3 of Figure 2 showing the means for holding the lower portion of the seed tube in position.

Figure 4 is a sectional view taken along the line 4—4 of Figure 1.

Figure 5 is a fragmentary sectional view of the hopper bottom structure.

Referring now to the drawings, the present invention is illustrated as embodied in a planter having a suitable supporting frame to which a plurality of planting units 71, each having a furrow opener frame including a combined seed and fertilizer boot casting 75, are movably connected, as by upper and lower link members 86 and 94. Each seed-fertilizer boot or frame 75 carries a pair of disk furrow openers 101 journaled thereon in any suitable manner and a seed can 102 in the lower portion of which seed dispensing means is disposed. Each of the seed-fertilizer boots 75 is provided with a fertilizer passageway 107 and, rearwardly thereof, a bracket which may, where desirable or necessary, receive an auxiliary fertilizer conduit 109 to which a separate fertilizer furrow opener may be secured. Either of the fertilizer conduits 107 and 109 may receive a fertilizer tube, depending on whether it is desired to deposit the fertilizer in the furrow opened by the seed furrow openers 101 or in a separate furrow opened by a second tool. Seed from the seed can 102 is delivered into the furrow opened by the disks 101 by means that form the principal part of the present invention.

According to the present invention, new and improved seeding mechanism is provided for this planter, particularly accommodating and making use of the low mounting position of the seed cans so that the seed in passing from the seed can or container 102 to the ground moves through only a relatively short path. It will be noted that the seed can 102 includes a hopper 301 mounted on a hopper ring 302 provided with apertured lugs 303 carrying a hinge pin 304 which is received in a bracket 305 formed on the combined fertilizer and seed boot casting 75. This is conventional construction so far as the present invention is concerned. Also mounted on the pin 304 is a hopper bottom 306 comprising a ring-like member having lugs 307 which receive the pin 304. The ring portion of the hopper bottom 306 has a beveled periphery 308 spaced from but fairly close to the lower edge of the hopper bottom ring, the space between these portions being indicated in Figure 5 by the reference numeral 309. The hopper bottom 306 supports a false plate 311 and the latter supports a seed plate 312, having a dome or central section 315 and a planar marginal section 313, apertured, as at 314, to form seed cells. The peripheral edge of the seed plate section 313 is spaced fairly close to but slightly away from the adjacent walls of the hopper bottom ring 302, and likewise the periphery of the false plate 311 is also spaced slightly away from the walls of the lower edge of the hopper bottom ring 302. This particular construction has the advantage of providing for the discharge of dust and the like from the hopper 301, the dust falling out between the hopper bottom ring and the edges of the seed plate and the beveled portion 308 of the hopper bottom 306.

The false plate 311 is provided at one point in its periphery with a depending boss section 317 which is apertured, as at 318 (Figure 4), to form a curved seed passage and a socket section 319 communicating therewith. It will be noted from Figure 4 that the seed plate, which rotates in the direction of the arrow, is disposed just above the seed passage 318 and that the latter is curved generally in the direction of movement of the seed plate so that the seed passing outwardly from the seed cells 314 would move downwardly in a curved path of movement due to the action of velocity and/or the knockout mechanism (not shown) and the velocity imparted thereto by the rotation of the seed plate. The seed-fertilizer boot casting 75 is formed with a seed passage 325 which at its upper end is shouldered, as at 326, and enlarged as at 327. A seed tube 330 is disposable in the seed passage 325 and has an upper end that is received in the socket 319, as best shown in Figure 2. A collar or flange 328 is fixed, as by welding, to the upper end portion of the tube 330 and a spring 332 is disposed between the collar 328 and the loose washer 333 that rests on the shoulder 326 and loosely receives the upper end of the tube 330. The lower end of the tube 330 is held in position in the lower portion of the seed passage 325 by a pair of lugs 335, best shown in Figure 3. The action of the spring 332 is to continually urge the upper end of the tube 330 into the socket 319, and thus provide a tight connection between the seed conduit 330 and the seed passage 318 leading directly from the seed cells 314. A fertilizer tube leads downwardly from the fertilizer hopper bottom of the planter and may be connected into the fertilizer conduit 107 when it is desired to deposit the fertilizer in the same furrow with the seed. However, when it is desired to deposit the fertilizer in a separate furrow, preferably alongside but spaced from the seed furrow, the lower end of the fertilizer tube is disposed in the auxiliary fertilizer spout section 109.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a planter, a member having a generally vertical through opening with an upper section forming an enlarged chamber at the upper portion of said opening, the lower part of said chamber forming an upwardly facing shouldered section, a seed can mounted on said member and including a downwardly facing opening and a flange surrounding said downwardly facing opening, said flange having an internal diameter appreciably larger than the diameter of said downwardly facing opening, the portion of said seed can between said latter opening and said flange forming a downwardly facing shouldered section surrounded by said flange and terminating at a point above said upwardly facing section, a seed tube disposed in said through opening, a collar fixed to the upper portion of said tube below the upper end thereof, a washer loosely disposed about said tube below said collar, both said collar and said washer being disposed in said chamber in generally vertically spaced apart relation and said washer being adapted to engage the upper face of said upwardly facing shouldered section, and a spring surrounding said tube and acting between said washer and said collar for holding the collar at the upper end of said tube seated against the lower edge of said flange and the upper end of said tube seated within said flange.

2. In a planter, a member having a generally vertical through opening with an upwardly facing, diametrically enlarged shouldered section, a seed can mounted on said member and including a portion having a downwardly facing opening and a flange surrounding said downwardly facing opening, the internal diameter of said flange being larger than the diameter of said downwardly facing opening and the external diameter of said shouldered section, whereby said flange is adapted to enter said enlarged shouldered section, a seed tube disposed at its lower portion in said through opening and having an upper end disposable within said flange substantially in alignment with said downwardly facing opening, a collar fixed to the upper portion of said tube and disposable within said enlarged shouldered section below the upper end thereof and engageable with the lower edge of said flange when the upper end of said tube is disposed within said flange, a washer loosely disposed about the upper portion of said tube below said collar and adapted to seat against said upwardly facing shouldered section of said member, and a spring bearing at its lower end against the upper face of said washer and bearing at its upper end against the lower face of said collar for holding the upper end of said tube seated within said flange.

3. In a planter, a member having a generally vertical through opening with an upwardly facing shouldered section, a seed can mounted on said member and including a downwardly facing opening, a flange surrounding said downwardly facing opening, a seed tube loosely disposed in said through opening, a collar fixed to the upper portion of said tube below the upper end thereof, a washer loosely disposed about the upper portion of said tube below said collar and adapted to seat against said upwardly facing shouldered section of said member, a spring bearing at its lower end against the upper face of said washer and bearing at its upper end against said collar for holding the upper end of said tube seated within said flange, and a pair of lugs in the lower part of said through opening and engageable with the lower portion of said seed tube for holding the latter substantially against a wall of said through opening.

4. The invention set forth in claim 3, further characterized by the internal diameter of said through opening above said upwardly facing shouldered section being at least equal to the diameter of said washer, whereby said seed tube, spring and washer may be removed from said through opening when said seed can is removed from said member.

CLAUDE W. WALZ.
HOWARD F. CLAUSEN.

References Cited in the file of this patent
UNITED STATES PATENTS

| Number | Name | Date |
| --- | --- | --- |
| 999,602 | Slee | Aug. 1, 1911 |
| 1,281,588 | Krofta | Oct. 15, 1918 |
| 1,290,090 | Cole | Jan. 7, 1919 |
| 1,330,994 | Winkley | Feb. 17, 1920 |
| 1,617,273 | Piquet | Feb. 18, 1927 |
| 1,944,381 | Wamhoff | Jan. 23, 1934 |
| 1,947,086 | Hillyard | Feb. 13, 1934 |